May 12, 1953 — J. E. NACHOD, JR — 2,638,481
MALEIC ACID MANUFACTURE
Filed May 26, 1950
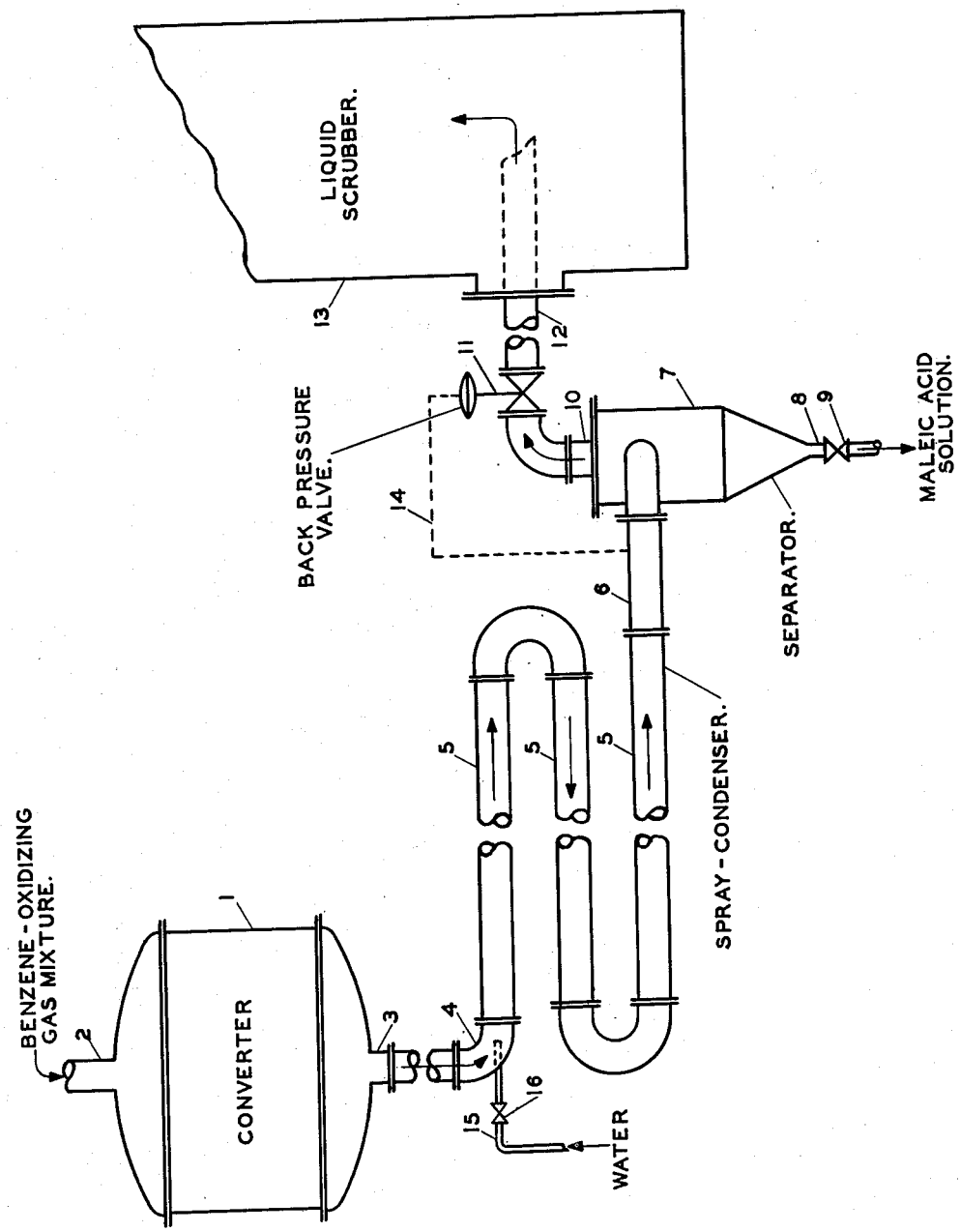
J. ERNEST NACHOD JR.
*INVENTOR.*
BY Ernest P. Peterson
AGENT.

Patented May 12, 1953

2,638,481

UNITED STATES PATENT OFFICE 2,638,481

MALEIC ACID MANUFACTURE

Julius Ernest Nachod, Jr., Newark, Del., assignor to Hercules Powder Company, Wilmington, Del., a corporation of Delaware Application May 26, 1950, Serial No. 164,411

10 Claims. (Cl. 260—533)

This invention relates to an improved process for recovery of maleic values (maleic acid and maleic anhydride) from hot vapors or gases containing the same. More particularly, it relates to an improved process for recovery of maleic values from the hot reaction gases resulting from the vapor phase oxidation of benzene.

Maleic acid and maleic anhydride are produced by oxidizing benzene with air or oxygen over a vanadium pentoxide catalyst at temperatures of from 400° to 650° C., the reaction being highly exothermic. The hot gases coming from the converter or reactor are cooled down by means of an indirect heat exchanger to 100° to 150° C. These heat exchangers may be of various types. For example, a heat exchanger of the shell and tube type may be used. S-bend condensers, either as such or jacketed for use with a liquid coolant, may be used. In the use of all of these heat exchangers the cooling is effected by indirect heat exchange with air or some liquid, preferably water. Once the gases have been cooled down to 100° to 150° C., several alternative procedures may be employed, depending upon whether one wants to obtain maleic anhydride directly or whether one wants to remove the maleic values in the form of maleic acid. If the former, it is the practice to lead the gases into a condenser where a portion of the maleic values is condensed at a controlled temperature and pressure. By properly controlling these conditions the maleic anhydride in the gases may be condensed in the form of a liquid or a solid. Any maleic values which do not condense and which remain in the gas stream are usually removed in a liquid (usually water) scrubber. If it is desired to remove all the maleic values from the gas stream as maleic acid, the condenser is dispensed with and the gases led directly to the liquid scrubber.

One problem, among others, which arises in the operation of the above-described process is that of tar formation. Tars form quite abundantly in the heat exchangers. As the tars build up, they tend to clog up the tubes through which the gases flow and cause erratic operation. When this condition is reached, it is necessary to shut down operations and free the system of tars. In fact, tar formation is such a factor in this process that it is not unusual to have to shut down every 3 or 4 days on the average for the purpose of cleaning the tars out of the system. Tar formation in maleic manufacture represents an added cost of manufacture in two ways. The time required to free the system of tars obviously increases the cost of manufacture. Furthermore, some of the maleic values in the gas stream are consumed in the process of tar formation thereby reducing the ultimate yield of maleic acid or anhydride.

I have now discovered a special technique for recovery of maleic values from the hot gases coming from the converter which surprisingly cuts down considerably on tar formation and in some cases it seems to avoid tar formation almost completely.

Broadly described, my invention comprises a process for continuously recovering maleic values from the hot gases resulting from the vapor phase partial oxidation of benzene which comprises quenching the hot gases by spraying water therein at a gas temperature of at least 300° C., condensing maleic values from the cool gases in the form of an aqueous solution or slurry of maleic acid, and separating the gas phase from the nongaseous phases. The water introduced at the quenching step is introduced at a rate sufficient to cool the hot gases down to a temperature at which maleic values will condense therefrom and to provide the water required to yield a maleic acid solution or slurry of the desired concentration. If desired, the water introduced in the quenching step may be introduced at a rate sufficient to cool the hot gases down to a point just above the dew point of the gases with respect to maleic anhydride. Thereafter, the cooled gases may be treated in one of several ways to remove the maleic values therefrom. For example, the maleic values may be removed by countercurrent scrubbing with water or an aqueous maleic acid solution. Also, the maleic values may be removed by simple condensation of maleic acid therefrom in a suitable condenser.

While the invention has been described in terms of gaseous reaction products produced by the vapor phase oxidation of benzene, it is not entirely necessary that the invention be restricted thereto. The invention has application to any gases or vapors which contain maleic values in substantial amount and in which the maleic values are the sole acidic constituents present in any significant or recoverable amount.

It is quite important that the temperature of the hot gases at the point of quenching is not below about 300° C. If they are below that temperature, the desirable result of this invention is not obtained, i. e., tar formation is not avoided to any significant degree. It is much preferred, in accordance with the invention, to quench the gases while they are at a temperature of from 400° C to 500° C. It is within this range that tar formation is cut to a minimum and from a practical standpoint tar formation is almost completely avoided. If the quenching is effected at gas temperatures within the range of 300° C. to 400° C., less satisfactory results are obtained although operation within this range does accomplish considerable reduction in the amount of tars formed as compared with the prior art procedures described hereinabove.

In the accompanying drawing I have shown diagrammatically a flow plan in which a preferred embodiment of my invention may be carried into effect. 1 designates a catalytic converter having an inlet conduit 2 and an outlet conduit 3. The outlet conduit leads to the inlet 4 of spray-condenser 5 and ultimately to the outlet 6 of the spray-condenser. The inlet 4 of the spray-condenser is a 90° bend of pipe in which there is disposed a portion of water line 15 in the manner shown in the diagram. The water line within the bend is substantially concentric with the first straight length of pipe in the spray-condenser. The water line is provided with valve 16. On the end of the water line within the 90° bend there is placed a suitable pressure atomizing nozzle (not shown in the drawing).

The spray-condenser is made up of pipes joined together in the form of S-bends as shown in the drawing. A suitable spray-condenser, for example, can be made by connecting up three 10-feet lengths of pipe with U-bends in the manner shown in the drawing. The pipes which make up the spray-condenser need not necessarily be joined together in such a manner as to form S-bends—other geometric shapes may be employed. For example, the pipes may all be joined together substantially horizontally, etc. The spray-condenser may be made of any material which is resistant to the hot vapors which are passed therethrough. If the process is being carried out in such a manner that as a result of the quenching step the gases are cooled merely to a point just above the dew point and not therebelow, this piece of equipment is more properly termed a "spray-cooler."

The outlet 6 of the spray-condenser leads to a separator 7 in which the liquid or slurry formed in the spray-condenser is separated from the vapor phase. The liquid outlet 8 of the separator is provided with a valve 9. The gas outlet 10 of the separator leads through back-pressure valve 11 to the inlet 12 to liquid scrubber 13. Broken line 14 shown connecting back-pressure value 11 and exit 6 of the spray-condenser 5 is a small gas line and is part of the pressure control apparatus.

A suitable separator is one in which the shell consists of an 18-inch section of 8-inch I. P. S. pipe with a 2-inch by 4-inch rectangular tangential inlet. In this type of separator a 3-inch I. P. S. pipe extending from the top of the separator to the middle of the inlet is mounted concentrically in the shell and serves as the gas outlet. An inverted conical section attached to the bottom of the 8-inch pipe serves as the liquid outlet. Various other types of separators may be used. In fact, any separator that provides for a decrease in gas velocity to allow the liquid droplets to settle; or any separator that provides an impingement of the gas in liquid mixture on a suitable baffle to "knock out" the liquid droplets; or any centrifugal type separator wherein the heavier droplets are thrown from the gas by its rapid whirling motion; or any separator involving combinations of these principles will be satisfactory.

The purpose of the liquid scrubber is to remove from the vapors which exit from the separator any remaining maleic values. This is accomplished by countercurrent contact of the vapors with a liquid in which the maleic values are readily soluble. The liquid usually employed is water. The scrubber usually takes the form of a tower. It may or may not be packed with suitable packing material such as grids, Raschig rings, etc., as desired. As indicated in the drawing, the vapors enter the tower at the bottom thereof and are contacted by water, or other liquid, passing downwardly through the tower.

The following example is submitted to illustrate the method of operating the above recovery system in connection with the catalyst oxidation of benzene to maleic anhydride.

Benzene vapor is mixed with air that has been compressed to about 3 atmospheres (gauge) in a weight ratio of about 1 to 30. This mixture preheated to about 300° C. enters converter 1 and is there converted by means of a vanadium oxide catalyst to maleic anhydride. The temperature of the hot gases exiting from the converter is in the range of 400° C. to 600° C. The exit temperature which obtains at any particular time is dependent upon the condition of the catalyst, particularly the activity thereof. In general, the more active the catalyst, the lower is the temperature at which maximum conversion of the benzene to maleic acid is achieved.

The hot gases passing from the converter 1 at a temperature of 400° to 600° C. are led into the spray-condenser 5 through the inlet 4 thereof. Water is sprayed into the hot gases in the inlet at such a rate that a substantial proportion of the maleic anhydride in the gases is caused to condense in the form of a solution or slurry of maleic acid. The temperature of the hot gases just before the introduction of the water is taken and recorded automatically. The concentration of maleic acid in the ultimate solution or slurry can of course be controlled by controlling the addition of water in the inlet.

The gases and maleic acid solution or slurry which leave the spray-condenser 5 pass into separator 7 where a separation between the gaseous and nongaseous phases is effected. The nongaseous products, i. e., the maleic acid solution or slurry, are removed from the system at this point through outlet 8. The gas phase passes through separator outlet 10, thence through back-pressure valve 11 and into the liquid scrubber 13 wherein the remaining maleic values are scrubbed out of the gases by countercurrent contacting with water.

In the following Table I there is compiled recovery data relating to five separate runs of 8 hours' duration each, each run being carried out in conformance with the example described above.

Table I

| Run | Percent Conversion [1] | Spray Condenser Pressure, p. s. i. g. [1] | Gas Temp. Before Spray, °C. [1] | Gas Temp. at Separator, °C. [1] | Total Liquor From Spray Condenser, lb. | Total Liquor From Liquid Scrubber, lb. | Total Maleic Acid From Spray Condenser, lb. | Total Maleic Acid From Liquid Scrubber, lb. | Total Maleic Acid Recovered, lb. |
|---|---|---|---|---|---|---|---|---|---|
| 1 | 45.5 | 29.0 | 444 | 90 | 749 | 362 | 156 | 128 | 284 |
| 2 | 36.4 | 28.5 | 446 | 85 | 380 | 318 | 135 | 100 | 235 |
| 3 | 48.5 | 29.0 | 449 | 88 | 426 | 369 | 147 | 136 | 283 |
| 4 | 35.7 | 29.0 | 478 | 86 | 454 | 418 | 148 | 157 | 305 |
| 5 | 30.5 | 30.0 | 423 | 87 | 435 | 225 | 141 | 75 | 216 |

[1] The data are average values for the 8-hour run.

The per cent conversions shown in Table I are obtained by the following formula:

$$\text{Percent conversion} = 100\% \times \frac{\text{mols of maleic acid formed}}{\text{mols of benzene used}}$$

The per cent conversions shown in the table are low due to the fact that the plant was being run at a much higher rate than it should have been to obtain maximum conversions. At lower rates, higher conversions are obtained.

Operations in conformance with the above-described example were carried out over a period of one month. During this period the temperature of the hot gases just prior to the introduction of the water was within the range of 400° to 500° C. The rate of introduction of water was controlled so that the maleic acid solution withdrawn from the separator was of 30 to 40% concentration. At the end of the month's operation an inspection of the equipment showed that there had been no appreciable tar formation. In contrast with this, the same plant when operated with a conventional recovery system, in which five heat exchangers replaced the spray-condenser and the separator, had to be shut down on the average of every 3 or 4 days for tar clean-out.

The equipment in which the quenching takes place has been referred to previously as a spray-condenser. This term has been employed inasmuch as both spraying of water into the hot gases and condensation of maleic values therefrom take place in this equipment. The drawing illustrates one form which this equipment may take. As has been stated before, the pipes may be joined together in various ways. The arrangement of the pipes in the form of S-bends, as shown in the drawing, is particularly desirable in that only a comparatively small area is required for the equipment. If desired, the spray-condenser may take the form of a vertical tank or tower. If a vertical tank or tower is used, the hot gases are led from the converter into the top of the tank or tower. The water spray is also introduced at or near the top of the tank or tower. The tank or tower is preferably unpacked. However, it is within the scope of this invention to employ a tank or tower packed with suitable packing materials such as grids, Raschig rings, etc., if desired.

In carrying out the invention, the manner of introduction of the water into the gas stream is not particularly critical. It is necessary, however, that the water be sprayed into the hot gases. A fine spray is preferred. Any of the known devices for converting water into spray form may be employed. Thus, for example, a water spray which is suitable for present purposes may be obtained either by pressure or air atomization may be used. Mechanical atomizing or gas atomizing may also be used, if desired. By introducing the water into the gas stream in the form of a spray, direct and intimate contact of the gases with the water is obtained.

When employing a spray-condenser of the type shown in the drawing or modification thereof, the spray nozzle is usually placed in the center of the inlet portion of the spray-condenser. Several spray nozzles may be employed, if desired. When employing a spray-condenser in the form of a tank or tower, the spray nozzle is usually positioned in the center of the uppermost part of the tank or tower. It may, however, be located in the side wall of the tower. Again, several nozzles may be employed, and they may be located on the same level in the tower in concentric arrangement, at different levels in the tower, etc.

It will be noted by reference to the above example that the spray-condenser was operated in such a manner as to provide an effluent maleic acid solution of 32 to 35% concentration. By so operating 55 to 60% of the maleic values were condensed from the gas stream in the spray-condenser. It is possible, if desired, to control the concentration of the effluent maleic acid solution by controlling the rate at which water is introduced. In fact, the water rate can be reduced to the point that a slurry of maleic acid is obtained rather than a solution. In general, however, as the concentration of the effluent maleic acid solution is increased the percentage of maleic values condensed from the gas stream is decreased.

As shown in the above example, the spray-condenser was operated at about 2 atmospheres pressure (gauge). The pressure at which this equipment is operated may be varied, however, as desired. It has been found that increasing the pressure above 2 atmospheres (gauge) tends to increase the rate of tar formation. Even at the higher operating pressures, however, the process described herein is much more advantageous than prior art processes operated at similar pressures from the standpoint of tar formation. Operation at increased pressures is of course advantageous in that it increases the production capacity of the system. An increase in pressure will also allow the condensation of the maleic values to take place at a higher temperature. This may be desirable if more concentrated solutions of maleic acid are desired.

A separator is shown in the drawing. It should be borne in mind that a separator is not always necessary. Thus, for example, where the gases from the converter are quenched in a spray-cooler to a temperature just above the dew point, there is no necessity for a separator following the spray-cooler. The cooled gases may be directly treated to remove maleic values by the methods described hereinabove.

The term "maleic values" is used herein to mean either maleic acid or maleic anhydride or both. The term is used in this sense in the art here involved and is used herein for simplicity of presentation.

All parts and percentages herein are by weight unless otherwise indicated.

What I claim and desire to protect by Letters Patent is:

1. A process for continuously recovering maleic values from the hot gases resulting from the vapor phase partial oxidation of benzene which comprises quenching the hot gases by spraying water therein at a gas temperature of at least 300° C., condensing maleic values from the cooled gases in the form of an aqueous solution or slurry of maleic acid, and separating the gas phase from the nongaseous phases, the water introduced in the quenching step being introduced at a rate sufficient to effect the condensation above referred to.

2. A process for continuously recovering maleic values from the hot gases resulting from the vapor phase partial oxidation of benzene which comprises quenching the hot gases by spraying water therein at a gas temperature of from 400° to 500° C., condensing maleic values from the cooled gases in the form of an aqueous solution or slurry of maleic acid, and separating the gas phase from the nongaseous phases, the water introduced in the quenching step being introduced at a rate sufficient to effect the condensation above referred to.

3. A process for continuously recovering maleic values from the hot gases resulting from the vapor phase partial oxidation of benzene which comprises quenching the hot gases by spraying water therein at a gas temperature of from 400° to 500° C., condensing maleic values from the cooled gases in the form of an aqueous 30% solution of maleic acid, and separating the gas phase from the nongaseous phases, the water introduced in the quenching step being introduced at a rate sufficient to effect the condensation above referred to.

4. A process for continuously recovering maleic values from the hot gases resulting from the vapor phase partial oxidation of benzene which comprises quenching the hot gases by spraying water therein at a gas temperature of from 400° to 500° C., condensing maleic values from the cooled gases in the form of an aqueous 30% solution of maleic acid, and separating the gas phase from the nongaseous phases, the water introduced at the quenching step being introduced at a rate sufficient to effect the condensation above referred to, the recovery process being carried out under a pressure of substantially 2 atmospheres (gauge).

5. A process for continuously recovering maleic values from the hot gases resulting from the vapor phase partial oxidation of benzene which comprises quenching the hot gases by spraying water therein at a gas temperature of at least 300° C., condensing maleic values from the cooled gases in the form of an aqueous solution or slurry of maleic acid, and separating the gas phase from the nongaseous phases, the water introduced at the quenching step being introduced at at rate sufficient to effect the condensation above referred to, the recovery process being carried out under a pressure of substantially 2 atmospheres (gauge).

6. A process for continuously recovering maleic values from hot gases containing such values but which are substantially free of other acidic constituents which process comprises quenching the hot gases by spraying water therein at a gas temperature of at least 300° C., condensing maleic values from the cooled gases in the form of an aqueous solution or slurry of maleic acid, and separating the gas phase from the nongaseous phases, the water introduced at the quenching step being introduced at a rate sufficient to effect the condensation above referred to.

7. A process for continuously recovering maleic values from the hot gases resulting from the vapor phase partial oxidation of benzene which comprises quenching the hot gases by spraying water therein at a gas temperature of at least 300° C., the water introduced in the quenching step being introduced at a rate sufficient to cool the hot gases to a temperature just above the dew point of the gases, and treating the resulting cooled gases to remove maleic values therefrom.

8. A process for continuously recovering maleic values from the hot gases resulting from the vapor phase partial oxidation of benzene which comprises quenching the hot gases by spraying water therein at a gas temperature of at least 300° C., the water introduced in the quenching step being introduced at a rate sufficient to cool the hot gases to a temperature just above the dew point of the gases, and treating the resulting cooled gases to remove maleic values therefrom by countercurrently scrubbing the cooled gases with an aqueous maleic acid solution.

9. A process for continuously recovering maleic values from the hot gases resulting from the vapor phase partial oxidation of benzene which comprises quenching the hot gases by spraying water therein at a gas temperature of at least 300° C., the water introduced in the quenching step being introduced at a rate sufficient to cool the hot gases to a temperature just above the dew point of the gases, and treating the resulting cooled gases to remove maleic values therefrom by countercurrently scrubbing the cooled gases with water.

10. A process for continuously recovering maleic values from the hot gases resulting from the vapor phase partial oxidation of benzene which comprises quenching the hot gases by spraying water therein at a gas temperature of at least 300° C., the water introduced in the quenching step being introduced at a rate sufficient to cool the hot gases to a temperature just above the dew point of the gases, and condensing maleic acid from the resulting cooled gases.

J. ERNEST NACHOD, Jr.

References Cited in the file of this patent

UNITED STATES PATENTS

| Number | Name | Date |
|---|---|---|
| 1,636,857 | Craver | July 26, 1927 |
| 1,686,913 | Jaeger | Oct. 9, 1928 |
| 2,098,047 | Jaeger et al. | Nov. 2, 1937 |
| 2,114,798 | Foster | Apr. 19, 1938 |
| 2,220,044 | Jaeger | Oct. 29, 1940 |
| 2,540,559 | Welty | Feb. 6, 1951 |